United States Patent
Uesaka et al.

(10) Patent No.: US 7,887,964 B2
(45) Date of Patent: Feb. 15, 2011

(54) FUEL CELL SYSTEM HAVING OPTIMIZED OUTPUT

(75) Inventors: Shinichi Uesaka, Kanagawa (JP); Takashi Tomita, Kanagawa (JP)

(73) Assignee: Sony Corporation, Tokyo (JP)

( * ) Notice: Subject to any disclaimer, the term of this patent is extended or adjusted under 35 U.S.C. 154(b) by 940 days.

(21) Appl. No.: 10/853,966

(22) Filed: May 26, 2004

(65) Prior Publication Data

US 2005/0003251 A1    Jan. 6, 2005

(30) Foreign Application Priority Data

May 29, 2003    (JP) ............................ 2003-152092

(51) Int. Cl.
*H01M 8/04* (2006.01)
(52) U.S. Cl. .................................... 429/430
(58) Field of Classification Search ............... 429/430
See application file for complete search history.

(56) References Cited

U.S. PATENT DOCUMENTS 6,268,077 B1    7/2001  Kelley et al.
7,247,398 B2 *  7/2007  Logan et al. .................. 429/13
2002/0150804 A1 * 10/2002  Srinivasan et al. ............ 429/32

FOREIGN PATENT DOCUMENTS

JP       07-153474       6/1995
JP       2000-188120     7/2000

OTHER PUBLICATIONS

Jaesung Han et al.; Direct methanol fuel-cell combined with a small back-up battery; Journal of Power Sources, Elsevier, Amsterdam, NL; vol. 112, No. 2; Nov. 14, 2002 pp. 477-483.

* cited by examiner

*Primary Examiner*—Patrick Ryan
*Assistant Examiner*—Karie O'Neill Apicella
(74) *Attorney, Agent, or Firm*—Robert J. Depke; Rockey, Depke & Lyons, LLC

(57) ABSTRACT

The present invention provides a fuel cell system that has a fuel cell portion including one or more unit cells, a fuel tank for storing fuel used in the unit cells, and a control portion for controlling the fuel cell portion. The number of unit cells is optimized so that a total amount of energy, which is outputted from the fuel cell system as a function of the number of unit cells or of an electrode area, shows a maximum value or a nearly maximum value. Thus, the amount of energy may be maximized or made to be equal to or more than a predetermined value. Accordingly, target devices to be supplied with power from the fuel cell system may be used for a longer time.

2 Claims, 5 Drawing Sheets

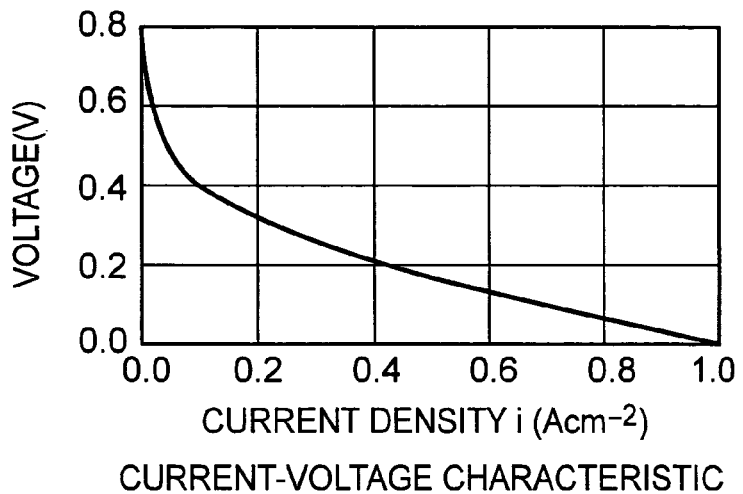
CURRENT-VOLTAGE CHARACTERISTIC
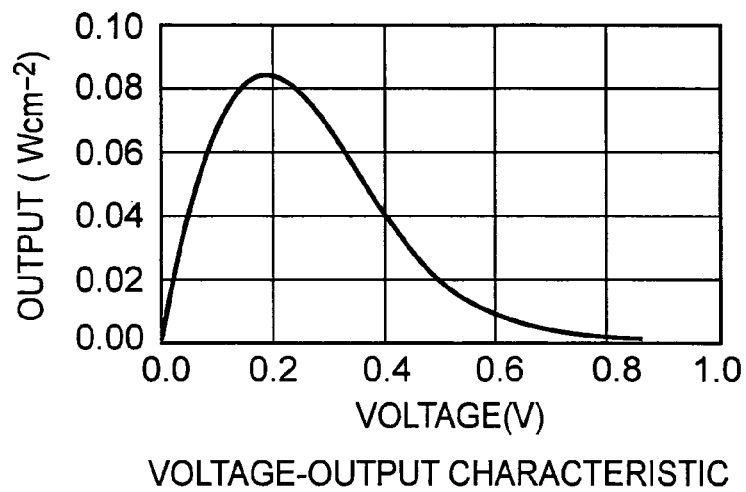
VOLTAGE-OUTPUT CHARACTERISTIC
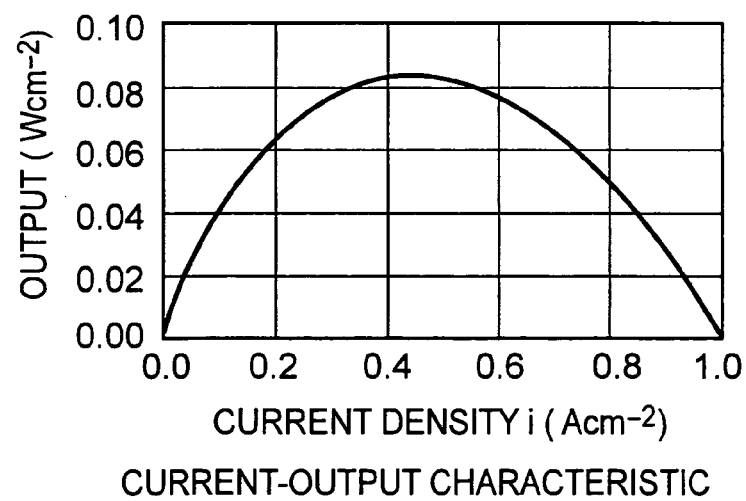
CURRENT-OUTPUT CHARACTERISTIC

US 7,887,964 B2

FUEL CELL SYSTEM HAVING OPTIMIZED OUTPUT

CROSS REFERENCES TO RELATED APPLICATIONS

The present invention claims priority to its priority document No. 2003-152092 filed in the Japanese Patent Office on May 29, 2003, the entire contents of which being incorporated by reference herein.

BACKGROUND OF THE INVENTION

1. Field of the Invention

The present invention relates to techniques for optimizing the number of unit cells or the electrode area thereof so as to maximize an amount of energy which the fuel cell system can output, thereby lengthening a drive time of a device to be supplied with electric power from a fuel cell system.

2. Description of Related Art

Recent advancement in functionality of portable electronic devices (for example, a notebook personal computer, a video camera, a digital camera, and a portable phone), which is accompanied by expansion of broadband, has a tendency of increase in necessary power for driving the devices.

Portable electronic devices are generally battery-operated for convenience thereof. As the enhancement of functionality and the miniaturization of portable electronic devices are advanced, increase in the energy density of batteries is demanded.

A lithium-ion secondary battery is known as one of major batteries. The volume energy density of the lithium-ion secondary battery is about 400 Wh per litter or more. However, it is said that the volume energy density of a fuel cell on which research and development are energetically conducted at present, for example, a direct methanol fuel cell using methanol as fuel is several times larger than that of the lithium-ion secondary battery. That is, the fuel cell is expected as a next-generation battery because of high energy density thereof. However, the output density per unit cell (or per single cell) of the fuel cell and the operating voltage thereof are low. Therefore, the fuel cell requires various contrivances in order to drive electronic devices.

For example, a configuration mode, in which the terminal voltage of a fuel cell is raised by a DC-DC converter to thereby generate a necessary voltage for driving an electronic device, is known (see, for instance, Japanese Patent Application Publication No. 2000-188120). The number of unit cells constituting the fuel cell is obtained by dividing the maximum power demanded of the fuel cell system by the maximum output per unit cell. The obtained number of unit cells is the minimum number of unit cells constituting the fuel cell system. Thus, miniaturization of a fuel cell can be achieved.

Also, a method for controlling what is called a hybrid fuel cell system, in which a fuel cell is combined with a rechargeable secondary battery, in such a way as to maximize an output of the fuel cell thereof has been proposed (see, for example, Japanese Patent Application Publication No. 7-153474).

Thus, the output density of the entire fuel cell system can be maximized by performing output design and control on the fuel cell in such a way as to cause the fuel cell to operate so that an output of the unit cell is close to the maximum output thereof.

SUMMARY OF THE INVENTION

However, a feature of the fuel cell does not reside in an output density thereof but in an energy density, that is, an amount of energy which the fuel cell can output. In other words, it is desirable to design a fuel cell so as that portable electronic devices may be operated for a longer time by utilizing the fuel cell. In contrast, there are attempts to maximize an output of the unit cell in a related system, so that a necessary amount of fuel therefor increases. Accordingly, the related system has a drawback in that energy density of the entire fuel cell system decreases.

Hereinafter, this drawback is described by using schematic graphs shown in FIGS. 6 to 8.

FIG. 6 illustrates the relation between an output current (I) and a terminal voltage of a unit cell (hereunder, this relation will be referred to as an "output-current-terminal-voltage characteristic")

A tendency, in which the terminal voltage is reduced with increase in the output current, is observed as a feature of the fuel cell.

FIG. 7 illustrates the relation between the terminal voltage and the output power (w) (hereunder referred to as "a voltage-output characteristic") of the fuel cell having such a current-voltage characteristic. FIG. 8 illustrates the relation between the output current (I) and the output power (w) (hereunder referred to as "a current-output characteristic") thereof.

As shown in FIG. 7, the power has a maximum value (hereunder designated as "$w_{max}$") if the terminal voltage represented by the axis of abscissa has a certain value (hereunder designated as "$V_{min}$"). As shown in FIG. 8, the power has a maximum value $w_{max}$ if the current I represented by the axis of abscissa has a certain value (hereunder designated as "$I_{max}$").

The fuel cell is usually designed so that the unit cells may be operated at a voltage that is equal to or higher than the lowest voltage $V_{min}$, at which the output power of the fuel cell shows the maximum power $w_{max}$. This is because of the facts that power obtained in a case, in which the unit cell is operated at a voltage lower than the lowest voltage $V_{min}$, may be outputted by operating the unit cell at a voltage higher than the lowest voltage $V_{min}$, and that the fuel cell may be operated by using a less amount of fuel if the fuel cell is operated at a higher voltage.

A system in a related art is designed so that the output of the unit cell is close to the maximum power $w_{max}$. However, as is apparent from the current-output characteristic shown in FIG. 8, if the power of the unit cell is set to be the maximum power $w_{max}$, a larger current, that is, a larger amount of fuel is needed therefor. As a result of increase in the necessary amount of fuel for obtaining the maximum power $w_{max}$ as an output of the unit cell, the energy density of the entire fuel cell system is reduced (that is, the feature of the fuel cell may not be exploited at all).

Accordingly, it is desirable to maximize an amount of energy which a fuel cell system may output as a whole, and to enable long-time supply of electric power to a target device to which the power is supplied. The present invention is made in view of the above described issues.

In a fuel cell system according to an embodiment of the present invention having a fuel cell portion, which includes one or more unit cells each including paired electrodes and an electrolyte, and having a fuel tank for storing fuel used in the unit cells, if E designates a total amount of energy outputted from the fuel cell system, n denotes the number of unit cells or an electrode area, and the total amount of energy E is represented by E(n), a function of the number of unit cells or the electrode area n, one of the following values of n is selected:

(1) a value of n at which E(n) shows a maximum value or a near maximum value thereof; and (2) a value of n at which E(n) shows a value obtained by multiplying the maximum value thereof by a coefficient that is less than 1.

Thus, according to the embodiment of the present invention, an amount of energy, which the fuel cell system can output, may be maximized or made to be equal to or more than a target value by optimizing the number of the unit cells or the electrode areas of the fuel cell system.

According to another embodiment of a fuel cell system of the present invention, if Vf(n) designates a function of n, which represents capacity of the fuel tank and Ia(n) denotes a function of n, which represents a total current flowing through the fuel cell system, an optimum value of n, at which E(n) being proportional to $\{Vf(n)/Ia(n)\}$ shows a maximum value or a near maximum value thereof, is selected. Thus, the optimum value $n_{opt}$ of the number of unit cells or the electrode area may be determined in consideration of energy efficiency and fuel capacity in the entire volume of the system. Accordingly, the amount of energy, which the fuel cell system can output, may be maximized.

According to still another embodiment of a fuel cell system of the present invention, if "I=f(w)" indicates a functional relation between a current I and an output power w of each of the unit cells, V denotes the entire volume of the fuel cell system, Vc designates the volume of each of the unit cells, and Vm represents the volume of a control portion for controlling the fuel cell portion, an optimum value of n, at which $E(n)=K \cdot Vf(n)/Ia(n)=K \cdot \{V-(Vm+n \cdot Vc)\}/n \cdot f(w)$. ("K" is a proportionality constant) shows a maximum value or a near maximum value thereof, is selected. Thus, if the fuel cell system is subjected to a constraint that fuel capacity is reduced by an increase in the number of unit cells or in the electrode area, the amount of energy, which the fuel cell system can output, may be maximized.

According to still another embodiment of a fuel cell system of the present invention, if $n_{min}$ designates a minimum value of n defined as a value obtained by dividing the maximum power demanded of the fuel cell system by the maximum output power of each of the unit cell, Vf(n) designates a function of n, which represents capacity of the fuel tank and Ia(n) denotes a function of n, which represents a total current flowing through the fuel cell system, an optimum value of n is determined in such a way that the total amount of energy E(n) is proportional to $\{Vf(n)/Ia(n)\}$, that a value of E(n) is equal to or more than a value obtained by multiplying the maximum value of E(n) by a coefficient, which is less than 1, and that the value of n is larger than $n_{min}$.

According to yet another embodiment of a fuel cell system of the present invention, if $n_{min}$ designates a minimum value of n defined as a value obtained by dividing the maximum power demanded of the fuel cell system by the maximum output power of each of the unit cell, "I=f(w)" indicates the function relation between a current I and an output power w of each of the unit cells, V denotes the entire volume of the fuel cell system, Vc designates the volume of each of the unit cells, and Vm represents the volume of a control portion for controlling the fuel cell portion, the value of n is determined in such a way that $E(n)=K \cdot Vf(n)/Ia(n)=K \cdot \{V-(Vm+n \cdot Vc)\}/n \cdot f(w)$. ("K" is a proportionality constant) is equal to or more than a value obtained by multiplying the maximum value of E(n) by a coefficient, which is less than 1, and that the value of n is larger than $n_{min}$.

Accordingly, as compared with a case that the number of unit cells or the electrode area is equal to the optimum value $n_{opt}$, reduction in the cost of the system and miniaturization thereof may be achieved by decreasing the number of unit cells or the electrode area.

BRIEF DESCRIPTION OF THE DRAWINGS

FIGS. 2A, 2B, and 2C are graphs illustrating an example according to an embodiment of the present invention, together with FIGS. 3 to 5; FIG. 2A is a graph illustrating a current-voltage characteristic; FIG. 2B is a graph illustrating a voltage-output characteristic; and FIG. 2C is a graph illustrating a current-output characteristic;

and

Figure 9:
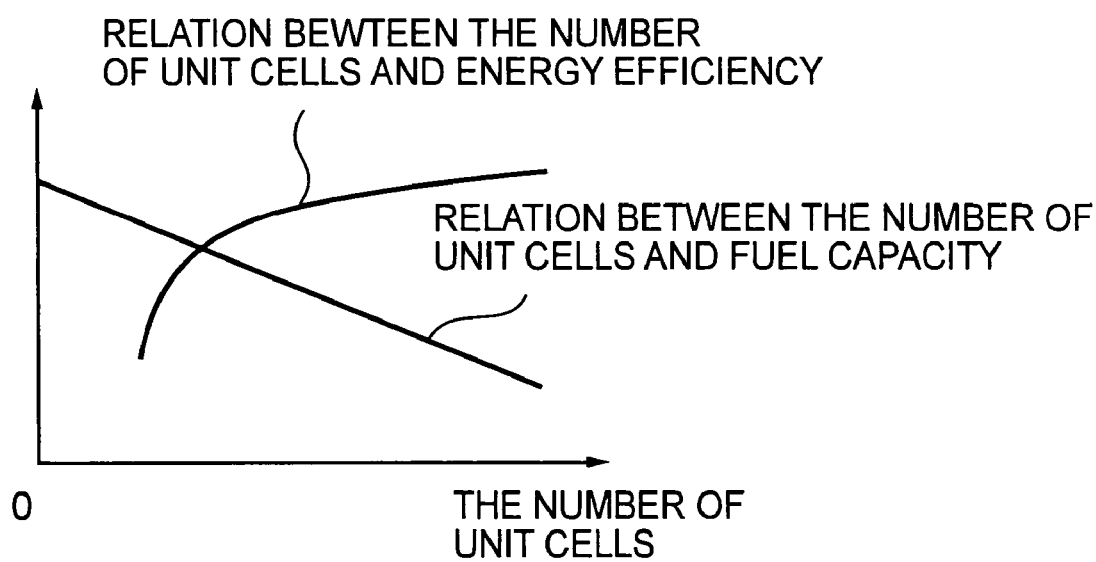

FIG. 9 is a graph illustrating a relation between the number of cells of a fuel cell and a fuel capacity and a relation between the number of unit cells and energy efficiency thereof.

DETAILED DESCRIPTION OF THE EMBODIMENTS

The present invention relates to a fuel cell system having unit cells, and is applied to, for example, a power supply unit of a portable electronic device. However, application of the present invention is not limited thereto. The present invention may also be applicable to an automobile power supply and to a household power supply. Chemicals, such as hydrogen and methanol, may be used as fuel for a fuel cell. Arbitrary material may be used as that of a fuel cell. Modes of configuration of a fuel cell system according to the present invention are as follows:

(1) a fuel cell system including only a fuel cell type power supply; and (2) a hybrid fuel cell system including a combination of a fuel cell type power supply and another type of power supply devices, such as a secondary cell type.

Before describing a system configuration, optimization of the number of unit cells used in the fuel cell system according to an embodiment of the present invention is described hereinbelow.

In the present specification, it is assumed that the expression "a unit cell" designates a fuel cell body sandwiched by two electrodes each having a unit electrode area, and that a unit cell does not include a fuel tank. Additionally, in the present specification, the expression "the number of unit cells" may be read "the electrode area" (that is, the number of unit cells and the electrode area have a proportionality relation).

Figure 8:
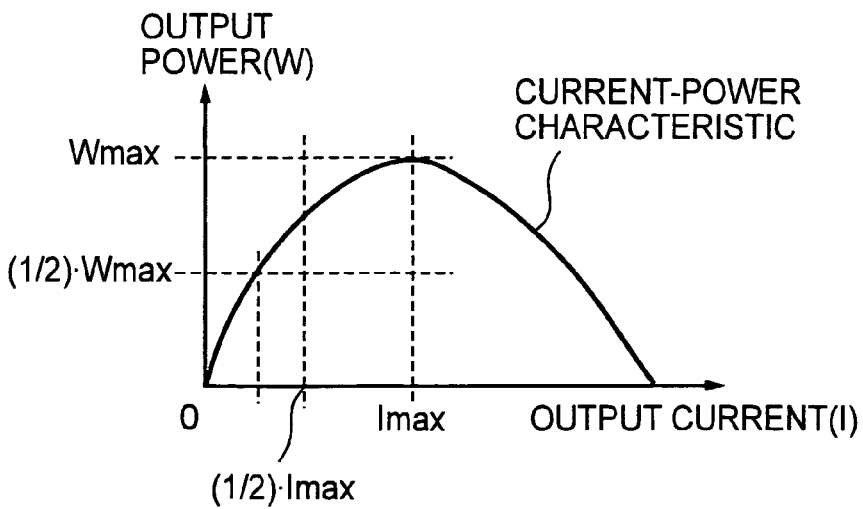
FIG. 8 is a graph illustrating an output-current-output-power characteristic of a fuel cell.

First, according to the current-power characteristic shown in FIG. 8, if an output of a unit cell is set to be half ($w_{max}/2$) the maximum power $w_{max}$, a necessary current for outputting the set power is equal to or less than half the current needed for outputting the maximum power $w_{max}$. Therefore, a fuel cell system adapted to output the maximum power $w_{max}$ by using two unit cells each set to output half the maximum power $w_{max}$ may output the same output power by using less current, as compared with a fuel cell system adapted to output the maximum power $w_{max}$ by using a single unit cell.

That is, if certain power is to be outputted, output power of each unit cell is reduced by increases the number of unit cells. Thus, the power may be outputted by using less fuel. Accordingly, energy efficiency may be increased.

On the other hand, increase in the number of unit cells affects a fuel amount. For instance, if the number of unit cells is increased, the volume of a fuel cell stack, in which unit cells are stacked, increases. In a case of a fuel cell system of a certain size or volume, increase in the volume occupied by the fuel cell system leads to reduction in fuel capacity.

FIG. 9 schematically illustrates this relation. The axis of abscissa thereof represents the number of unit cells. This figure shows a graph curve representing the relation between the number of unit cells and energy efficiency, in addition to another graph curve representing the relation between the number of unit cells and fuel capacity.

Although the energy efficiency is increased by increasing the number of unit cells, the fuel capacity decreases with the increase in the number of unit cells. That is, an amount of energy which the fuel cell system can output is determined by the product of the energy efficiency and the fuel capacity. Thus, it is found that the amount of energy has a maximum value at a certain number of unit cells.

The minimum number of unit cells (hereunder designated by "$n_{min}$") is obtained by dividing the maximum power demanded of the fuel cell system (hereunder designated by "$W_{max}$") by the maximum power $w_{max}$ which each unit cell may output. Therefore, the amount of energy which the fuel cell system can output may be maximized by setting an actual number of unit cells at an optimum value that is larger than the minimum number $n_{min}$ of unit cells and determined by the energy efficiency and the fuel capacity of each unit cell.

Figure 1:
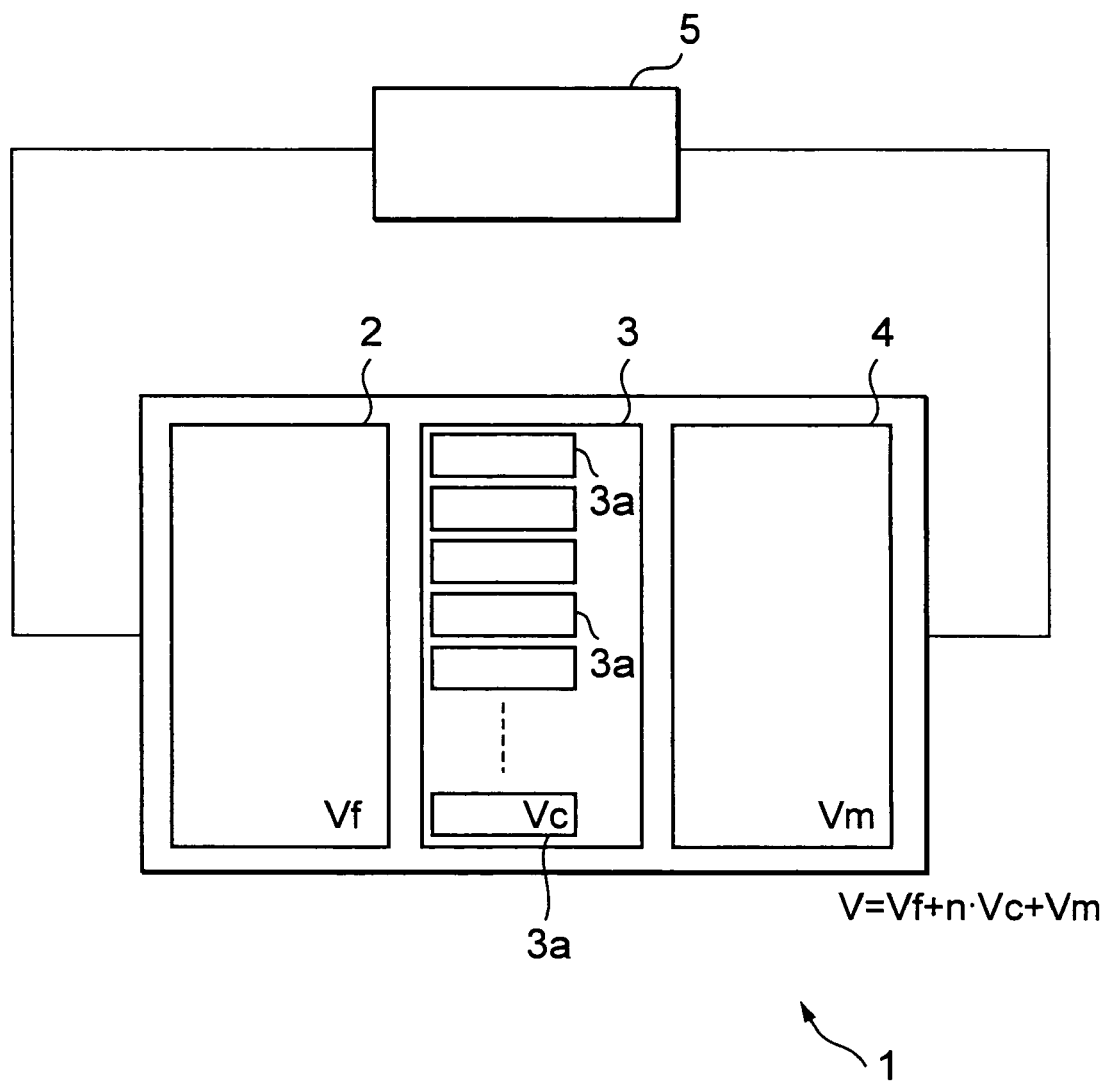
FIG. 1 is a diagram illustrating a basic configuration of a fuel cell system according to an embodiment of the present invention.

FIG. 1 is a diagram illustrating the basic configuration of a fuel cell system according to an embodiment of the present invention. In this case, a system including only by a fuel cell type power source such as a direct methanol fuel cell is illustrated.

A fuel cell system 1 comprises a fuel tank 2, a fuel cell portion 3, and a control portion 4, and is connected to a load 5, for example, a portable electronic device.

The fuel tank 2 stores fuel to be used in a fuel cell unit cell, that is, fuel (methanol in this case) needed for power generation. The configuration mode of the system according to this embodiment may be of either a stationary type in which the fuel tank 2 is fixed to the system, or a cartridge type in which the fuel tank 2 is detachably attached to the system.

The fuel cell portion 3 comprises unit cells $3a$, . . . and $3a$, each of which consists of paired electrodes and an electrolyte. For instance, a fuel cell stack having a structure, in which the unit cells are stacked, may have a series configuration in which plural unit cells are stacked in series, a parallel configuration in which plural unit cells are stacked in parallel, and a combined configuration that is a combination of both the series configuration and the parallel configuration.

In each of the unit cells $3a$, a solid electrolyte membrane is held by, for instance, a fuel electrode and an air electrode.

The present invention is not limited to the system using a single fuel cell stack in which plural unit cells are stacked. The system may use a plurality of the stacks. The unit cell may be one set (or one pair) of electrodes (in this case, the number of unit cells is equivalent to the electrode area itself).

The control portion 4 for controlling the fuel cell portion 3 includes control devices needed for controlling the fuel cell system, for example, a fuel supply device for controlling the flow rate of fuel, a device for monitoring an output voltage of the fuel cell, and a circuit, such as a DC-DC converter, for raising the output voltage.

A total amount of energy outputted from the fuel cell system 1 (hereunder designated by "E") may be represented by a function E(n) of the number of unit cells (or an electrode area) (hereunder designated by "n").

First, symbols used in the following description are summarized as follows:

$W_{max}$: the maximum power demanded of the fuel cell system 1.

$w_{max}$: the maximum output power of each of the unit cells $3a$.

I=f(w): a current-output characteristic (function) of each of the unit cells $3a$.

V: capacity of the entire fuel cell system.

Vc: capacity of each of the unit cells $3a$.

Vm: capacity of the control portion 4.

Vf: a volume of fuel (internal capacity of the fuel tank 2).

Ia: total current flowing through the entire fuel cell system.

The capacity "Vm" does not vary even if the number of unit cells increases (that is, it is assumed that the capacity "Vc" includes an increment of the volume V associated with increase in the number of unit cells, for example, the volume of fuel supply pipes).

The minimum number $n_{min}$ of unit cells needed for operating this fuel cell system is obtained by:

$$n_{min}=W_{max}/w_{max}.$$

On the other hand, the power w demanded of each of the unit cells is given by:

$$W=W_{max}/n$$

where "n" designates the number of unit cells.

At that time, the total current Ia flowing the entire fuel cell system is given by:

$$Ia=n \cdot f(w).$$

In consideration of the fact that the power w is inversely proportional to the number n of unit cells, it is found that Ia is represented by a function Ia(n) of n.

The capacity Vf of fuel is given by:

$$Vf=V-(Vm+n \cdot Vc).$$

Thus, the capacity Vf of fuel is represented by a function Vf(n) of n.

Therefore, the total amount of energy E, which the fuel cell system can output, is proportional to a quantity obtained by dividing Vf by Ia, and represented as follows:

$$E(n)=K \cdot Vf(n)/Ia(n)=K \cdot \{V-(Vm+n \cdot Vc)\}/n \cdot f(w).$$

where "K" is a proportionality constant, which is determined by the energy density of fuel itself.

In view of the facts that V, Vm, Vc, and K are constant, and that w is determined by dividing $W_{max}$ by n, this relational expression indicates that E is a function of n.

In the fuel cell system according to an embodiment of the present invention, the number of unit cells (or the electrode area) is set at an optimum value "$n_{opt}$", so that $E(n_{opt})$ shows a maximum value or a nearly maximum value. That is, the fuel cell portion (or the cell stack) comprises the unit cells (or the electrode area) of the optimum value $n_{opt}$ at which the total amount of energy, which the fuel cell system can output, is maximized (incidentally, $n_{opt} > n_{min}$). Specifically, the optimum value $n_{opt}$ is determined in such a way as to maximize the value of the function $E(n)=K \cdot \{V-(Vm+n \cdot Vc)\}/\{n \cdot f(w)\}$ ($E(n) \leq E(n_{opt})$ for a given n).

If $n=n_{opt}$, the total amount of energy which the fuel cell system can output is maximized. However, practically, it is necessary to consider various matters, for instance, reduction in the energy efficiency and increase in the cost due to variation among the unit cells. Thus, it is assumed that the number of unit cells (or the electrode area) used in the fuel cell system may have a value which is less than the optimum value $n_{opt}$. That is, the value of n or the lower limit thereof may be determined so that the total amount of energy E is equal to or more than a threshold value obtained by multiplying the maximum value of the amount E by a coefficient (hereunder designated by "α"), which is less than 1. For example, the total amount of energy in the case of α=0.9 should be equal to or more than 90% of the maximum value of the total amount of energy. Therefore, the value of n may be less than $n_{opt}$. Additionally, in the case where α=0.8 (corresponding to 80% of the maximum value of the total amount of energy), the value of n may further decreases (however, the value of n should be equal to or more than non).

EXAMPLE

Next, a practical example is described hereinbelow by referring to results of a simulation, which are illustrated in FIGS. 2A to 5.

FIGS. 2A, 2B, and 2C illustrate characteristics of each of unit cells used in this example according to an embodiment of the present invention. FIG. 2A is a graph, whose axis of abscissa represents a current density and whose axis of ordinates represents a voltage, for illustrating a current-voltage characteristic. FIG. 2B is a graph, whose axis of abscissa represents a voltage and whose axis of ordinates represents a output density, for illustrating a voltage-output characteristic; and FIG. 2C is a graph, whose axis of abscissa represents a current density and whose axis of ordinates represents an output density, for illustrating a current-output characteristic.

These characteristics were obtained by a simulation. In practice, the unit cell is connected to, for instance, a device that may control the load. The characteristics may be obtained by measuring the current and the voltage thereof while the load is changed. It is desirable that this measurement is performed under an environment (for example, a temperature), in which the fuel cell is actually used.

In a case where the electrode area of such a unit cell is assumed to be 1 cm², the maximum output power $w_{max}$ of this unit cell is 83.8 mW. In a case where the maximum power $W_{max}$ demanded of the fuel cell system is 1 W, $n_{min}$ is about 12, because 1 W/83.8 mW≅12. In this case, as is seen from FIG. 2C, magnitude of current flowing through the unit cell is 0.451 A.

Figure 3:
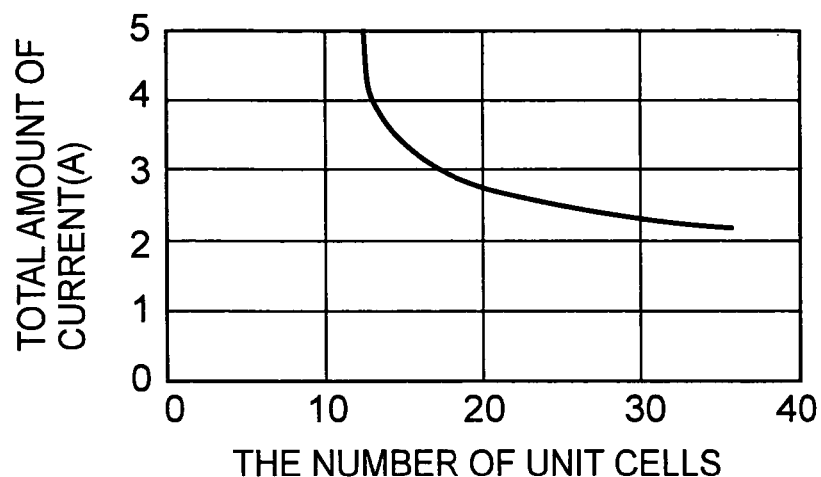
FIG. 3 is a graph illustrating how a total current needed for the entire fuel cell decreases with increase in the number of unit cells if certain power is outputted.

Output power $w(=W_{max}/n)$ demanded of each of unit cells in a case, in which the number of unit cells is assumed to be n, is calculated. Then, current I needed for obtaining the calculated output power is found from FIG. 2C. FIG. 3 shows a total current Ia obtained by multiplying the found current by the number of unit cells n (the axis of abscissa represents the number of unit cells as a continuous quantity, and the axis of ordinates indicates Ia). As is apparent from this graph, current needed for obtaining a power of 1 W, thus, fuel therefor is reduced by increasing the number of unit cells.

Figure 4:
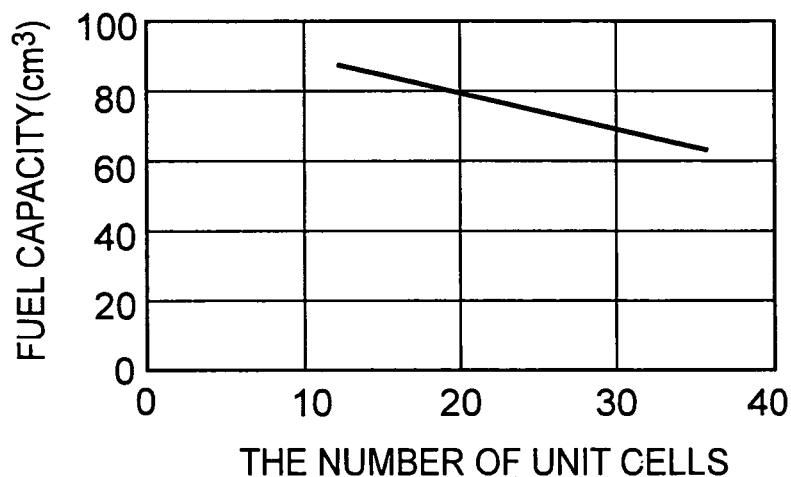
FIG. 4 is a graph illustrating how a fuel capacity decreases with increase in the number of unit cells.

Meanwhile, FIG. 4 shows the relation between the capacity Vf of the fuel tank and the number of unit cells n (the axis of abscissa represents n as a continuous quantity, and the axis of ordinates indicates Vf) in a case that the capacity V of the entire system is assumed to be 125 cm³, that the capacity Vm of the control portion 4 is assumed to be 25 cm³, and that the capacity Vc of the unit cell 3a is assumed to be 1 cm³.

Figure 5:
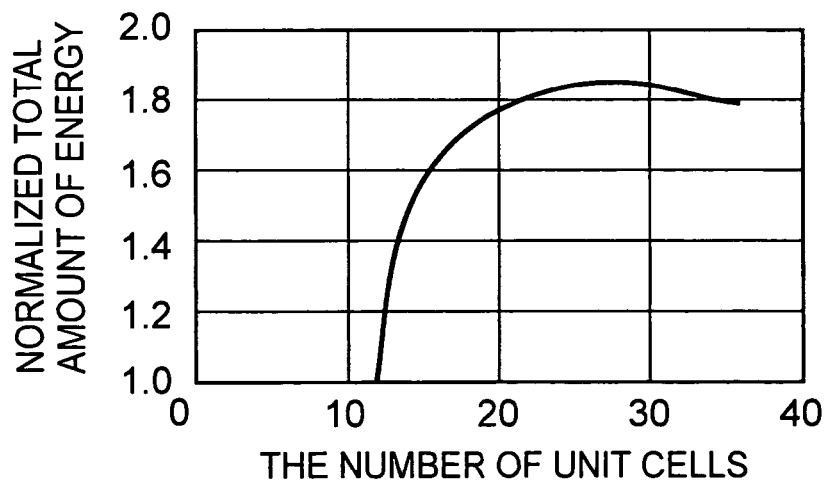
FIG. 5 is a graph illustrating the relation between the number of unit cells and a normalized total amount of energy.
Figure 6:
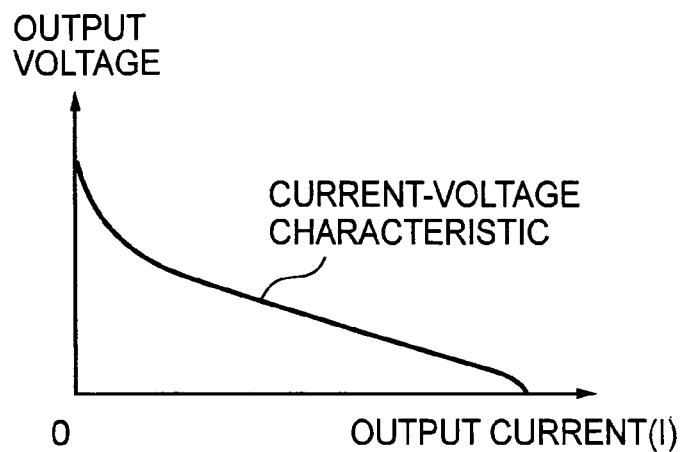
FIG. 6 is a graph illustrating an output-current-terminal-voltage characteristic of a fuel cell.
Figure 7:
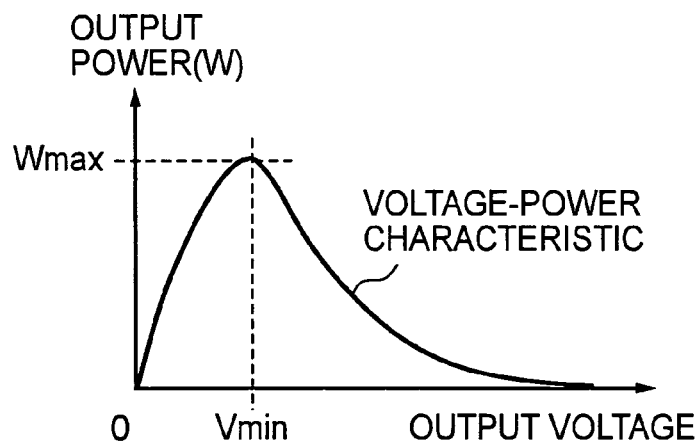
FIG. 7 is a graph illustrating a terminal-voltage-output-power characteristic of the fuel cell.

FIG. 5 shows the relation between the total amount of energy E of this fuel cell system and the number of unit cells n that is represented as a continuous quantity, based on FIGS. 3 and 4. The axis of ordinates of FIG. 5 represents a normalized total amount of energy, which is obtained by dividing the total amount of energy corresponding to the number of unit cells by the total amount of energy in the case that the number of unit cells is the minimum number of unit cells $n_{min}$(=12).

In the case of this example, the total amount of energy, which this fuel cell system may output, may be maximized by setting the number of unit cells at 27. The maximum value of the total amount of energy is 1.85 times the value of the total amount of energy in the case of the minimum number of unit cells $n_{min}$(=12).

Although increase in the number of unit cells leads to increase in the cost, preferably, the fuel cell system is configured so that the value of the total amount of energy outputted by the fuel cell system is equal to or more than 90% of the maximum value of the total amount of energy. In the case of this example, it is necessary that the number of unit cells is equal to or more than 17. In a case of a fuel cell system whose total amount of energy should have a value that is equal to or more than 80% of the maximum value of the total amount of energy, it is necessary that the number of unit cells is equal to or more than 14.

Thus, with the above-mentioned configuration, the embodiments of the present invention may obtain the following advantages:

(1) An amount of energy, which a fuel cell system according to an embodiment of the present invention can output, may be maximized by optimizing the number of unit cells used in the fuel cell system. Accordingly, target devices, such as portable electronic devices, to be supplied with electric power from the fuel cell system may be used for a longer time.

(2) A voltage generated by a fuel cell of a fuel cell system may be raised by setting the number of unit cells, which are used in the fuel cell system, to be more than the minimum number of unit cells $n_{min}$. This enhances the possibility that voltages needed for driving electronic devices and the like may be achieved only by a fuel cell type power source. In this case, a step-up DC-DC converter is unnecessary. Even if the voltages needed for driving electronic devices and the like may not be achieved only by the fuel cell type power source, the voltage generated by the fuel cell increases. Accordingly, miniaturization of a DC-DC converter thereof and enhancement of efficiency thereof maybe achieved. Also, miniaturization of the entire fuel cell system may be achieved.

It should be understood by those skilled in the art that various modifications, combinations, sub-combinations and alterations may occur depending on design requirements and other factors insofar as they are within the scope of the appended claims or the equivalents thereof.

What is claimed is:

1. A fuel cell comprising: a fuel cell portion having one or more unit cells, each including paired electrodes and an electrolyte, and a fuel tank for storing a fuel that is supplied to the unit cells, wherein, n denotes a number of unit cells or a total area of the electrodes; and wherein, n is greater than $n_{min}$, $n_{min}$ represents a minimum value of n that is defined to be $W_{max}/w_{max}$, where $W_{max}$ represents a maximum power demanded from the fuel cell and $w_{max}$ represents the maximum output power of each unit cell and further wherein, V represents the entire outer volume of the fuel cell structure, Vc designates the volume of each of the unit cells, and Vm represents the volume of a control portion for controlling the fuel cell portion, K is a proportionality constant based on an energy density of the fuel, and the fuel cell is designed based on analysis of the equation $E(n)= K \cdot \{V-(Vm+n \cdot Vc)\}/n \cdot f(w)$; and further wherein E(n) is a total amount of energy output from the fuel cell as a function of n and f(w) is a function of output power.

2. The fuel cell according to claim 1, wherein n is an optimal value, an optimal value of n is selected such that E(n), is a maximum value or substantially maximum value.

* * * * *